United States Patent
Haussmann et al.

(10) Patent No.: US 6,595,192 B1
(45) Date of Patent: Jul. 22, 2003

(54) IGNITION CONTROL DEVICE AND METHOD

(75) Inventors: Martin Haussmann, Sachsenheim (DE); Harry Friedmann, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,458

(22) PCT Filed: Oct. 22, 1999

(86) PCT No.: PCT/DE99/03390

§ 371 (c)(1), (2), (4) Date: Jan. 18, 2002

(87) PCT Pub. No.: WO00/57053

PCT Pub. Date: Sep. 28, 2000

(30) Foreign Application Priority Data

Mar. 22, 1999 (DE) .......................................... 199 12 770

(51) Int. Cl.[7] .................................................. F02P 9/00
(52) U.S. Cl. ................ 123/609; 123/406.58; 123/406.6
(58) Field of Search ............................ 123/609, 406.58, 123/406.6

(56) References Cited

U.S. PATENT DOCUMENTS

| | | | | |
|---|---|---|---|---|
| 3,757,755 A | * | 9/1973 | Carner .................. | 123/406.59 |
| 3,908,616 A | * | 9/1975 | Sasayama ............. | 123/406.6 |
| 3,941,103 A | * | 3/1976 | Hartig .................. | 123/406.63 |
| 4,082,069 A | * | 4/1978 | Mayer .................. | 123/406.63 |
| 4,217,868 A | * | 8/1980 | Grather et al. ........ | 123/406.6 |
| 4,253,443 A | * | 3/1981 | Seeger et al. ........ | 123/609 |
| 4,303,977 A | * | 12/1981 | Kobashi et al. ....... | 123/609 |
| 4,359,988 A | * | 11/1982 | Matsubara ............ | 123/609 |
| 4,367,530 A | | 1/1983 | Morinaga et al. | |
| 4,378,778 A | * | 4/1983 | Harter .................. | 123/406.6 |
| 4,429,365 A | * | 1/1984 | Luckman et al. ..... | 123/406.6 |
| 4,594,981 A | | 6/1986 | Gloss et al. | |
| 4,615,318 A | | 10/1986 | Imoto et al. | |

OTHER PUBLICATIONS

Adler Urlich, *Kraftfahr Technisches Taschenbuch*. 1995, Robert Bosch GMBH 22, Stuttgart, Germany.*

* cited by examiner

*Primary Examiner*—Erick Solis
(74) *Attorney, Agent, or Firm*—Kenyon & Kenyon

(57) ABSTRACT

An ignition control device for controlling an ignition coil device for an internal combustion engine, having an angle measuring device for measuring the current crank angle of the internal combustion engine and for outputting an equidistant angle pulse signal and an angle signal for indicating the respective beginning of a working cycle. The ignition control device includes a synchronization device for synchronizing the angular positions of the individual cylinders to the output signal of the angle measuring device, a rotational speed measuring device for measuring the rotational speed of the internal combustion engine at a measuring time point within the ignition cycle of an individual cylinder, and a calculating device for calculating a preestablished ignition angle corresponding to the measured rotational speed. A preestablished charging time corresponds to the measured battery voltage, and a beginning charging angle corresponds to the respective calculation angles in accordance with the synchronization. An ignition control value output device for outputting the beginning and the ending of the charging time.

18 Claims, 4 Drawing Sheets

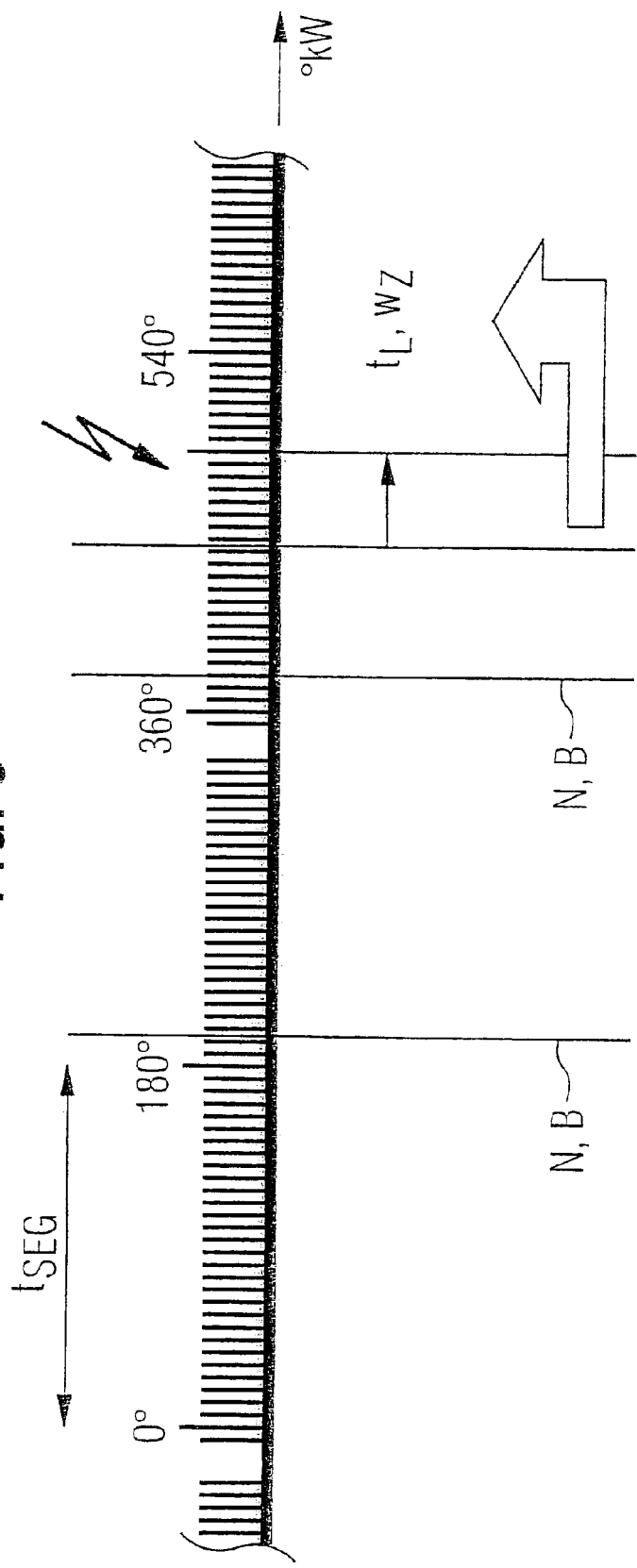

IGNITION CONTROL DEVICE AND METHOD

FIELD OF THE INVENTION

The present invention relates to an ignition control device as well as to a corresponding ignition control method.

Although it is applicable to any ignition control system, the present invention is discussed with respect to an engine control unit that is located on board a motor vehicle.

BACKGROUND INFORMATION

Ignition control devices for controlling ignition events for coil ignition systems and devices have essentially two control functions: controlling a desired ignition power over the duration of connection, i.e., the duration of the charging of the ignition coil; and controlling an ignition pulse over the duration of disconnection, i.e., the termination of charging of the coil, using a correct angle.

The ignition power, which in coil ignition systems is metered over a charging time of the coil, is of varying magnitude in accordance with the vehicle system voltage applied to the electrical circuit of the coil and with the time constant of the electrical circuit.

Usually, the specific setpoint values are stored in the control unit as a characteristics field, as a function of the rotational speed and other possible engine parameters.

Conventional ignition control methods are designed for a specific control unit for a specific engine or a specific automobile manufacturer.

If an ignition control device is to be designed for a control unit platform that can be used in any SI engine in accordance with the control and regulation requirements of any customer, then new demands arise for the ignition control method in question.

Conventional ignition output has a substantially self-sufficient operation. An attempt is made to process as much information as possible in the ignition output in parallel and independently, so as to obtain the greatest possible degree of dynamic impact and output precision. For example, a separate rotational speed measurement for the ignition output is customary, being as close as possible, in terms of the angle, to the ignition event, in order to keep the error in the necessary prediction of the rotational angle curve in the dynamic as small as possible. In addition, an attempt is made to calculate the ignition events individually for each cylinder, to the greatest extent possible in parallel fashion.

For example, if it is detected that, due to the advances in the ignition events, the measuring location of the angular velocity must also be shifted, then this shift must be carried out only once and does not have an effect on the calculation of the ignition events for the other cylinders. If an engine control system cannot calculate all of the cylinders individually, for example due to lack of resources, then the attempt is made to form at least one group of cylinders that are similar within the engine.

For an ignition system that is designed for a platform, this method is very expensive, especially in terms of hardware resources. Ignition control systems that require reduced computing expense show that dynamic errors can be sufficiently compensated for by dynamic derivative actions with regard to the ignition angle or the dwell time.

Ignition methods having their own calculation chains avoid application expense, but use more hardware resources, and they also require, depending on the computing architecture, longer job execution times. A further point which characterizes many of the ignition outputs used today is that their output signals are usually fixedly assigned to specific hardware outputs. A method of this type makes project configuration cumbersome when the method is used in a control platform.

Furthermore, a very few ignition output methods check the mixture state of the cylinder that is to be fired. In the new generations of engines, which use plastic intake pipes, the problem of induction pipe explosions has arisen in various ways. This problem can be minimized by first igniting cylinders that are filled in a defined manner.

Therefore, an ignition method has heretofore been lacking that can service as many cylinders as possible using minimal hardware/controller resources, that can easily be configured in accordance with target hardware, and that can be controlled by the injection system.

For outputting angle signals, conventional control units use an angle transmitter wheel, which delivers to the ignition control device pulses that are equidistant in terms of angle. However, for reasons of computational job execution times, the calculation of the ignition events can only take place in most ignition control device architectures in segments, one segment being the angular interval of 720° of the crankshaft divided by the number of cylinders, i.e., in a four-cylinder engine, for example, 180°. Therefore, although the angular positions of the ignition events ascertained in the calculation are measured sufficiently precisely via the angle transmitter wheel and the timer/counter circuits that are customary in the ignition control devices, nevertheless the calculation itself proceeds on the basis of a measured rotational speed, which in a rotational speed dynamic is no longer present at the location of ignition.

SUMMARY OF THE INVENTION

Thus, it is desirable to design an ignition control device for the output of ignition events that is able to operate in overall engine control system, which can be used in the greatest possible number of system environments and under the most varied possible system conditions.

Because only a limited framework for control components is available at any one time (e.g., interrupt channels on a predefined controller) for reasons of cost optimization, the device and the method should be able to be realized at a minimal expense, above all with respect to hardware resources. The design of the ignition control method should be modular to the greatest extent possible in order to be able to adjust the ignition control method to various control variants as simply as possible.

The ignition control device according to the present invention has the advantage, with respect to the conventional approaches to the problem, that the design of the ignition control method incorporates the results of analysis of a multiplicity of engine variants. In comparison to the current ignition control methods, the designed ignition output is simpler, more capable of being configured, requires fewer resources, and has clearly defined interfaces, through which the other engine control functions can interact with the ignition output. In particular, the potential interaction with the injection output makes it possible to address the problem of induction pipe backfiring at 0 rotational speed and the problem of uneven starting.

In contrast to the technically current ignition output methods, the described ignition output interacts with other devices for the output of hardware events. In this case, one especially favorable interaction is, for example, querying the status of the injection. In this context, the injection system supplies to the ignition output the information that a defined filling of a cylinder with fuel has taken place. Subsequently, the ignition system will fire this cylinder as a first ignition.

Current ignition outputs begin with the ignition irrespective of the mixture state when the beginning of a 360 degree interval is detected or when simultaneous cylinder detection occurs. In this context, the ignition takes place in undefined mixture states. For example, if a too-lean mixture is ignited, this can result in delayed combustions and in the worst case, even in an explosion of the induction pipe. Furthermore, given a rich mixture, it is possible for the engine to run-up unevenly as a result of pronounced buildup of film on the walls in the induction pipe, which has a disturbing effect on the driving sensitivity, but also potentially on the introduction of exhaust gas reactions.

Conventional technical ignition output methods are not designed with a view to outputting different output patterns simultaneously. Usually, information as to which hardware channels are to be activated in an ignition is fixedly bound to the hardware itself. The ignition output according to the present invention is designed to operate in a plurality of control unit variants with out hardware adjustments and the costs associated therewith. The form and design of the signals delivered from the ignition output to the components can be taken from a table, which is accessed during the program running time of the calculating routines. Therefore, project adjustments of the software are similarly minimized.

In contrast to conventional systems, in the ignition output described, no autonomous evaluation of the transmitter signal is required. The event calculation takes place with regard to the synchronous process that is generally continually present in engine control systems. As a result of the fact that the ignition output also makes use of a general comparator circuit of the rotational speed measuring device, which can be configured on the basis of a comparison of time but also of angle, for angle counting and increment refinement only one single activation line is needed for the calculating unit. If the ignition output is converted to conventional controllers without parallel computing units (so-called economical system), then for the entire ignition output only two interrupt channels are required. If one interrupt is used for sending the current and one interrupt is used for interrupting the current, then any number of cylinders can be served. The assignments of the cylinders and their special modes are realized using correspondingly complex buffer structures. In this manner, controller and hardware resources are saved which can be used by other functionalities. Although the ignition output, built up in this manner, has the characteristic of being dynamically somewhat less current than most conventional methods, nevertheless in trials it has been demonstrated that the output precision achieved is sufficient for the requirements of an SI engine.

According to one refinement, an enabling device is provided for enabling the ignition control value output if an injection has occurred.

According to a further refinement, the ignition control value output device is configured such that it outputs the charging time of the ignition coil device starting from the beginning charging angle by appending on to the charging time in a charging time output mode, and by counting out a charging angle until the occurrence of the ignition event, in an ignition angle output mode.

According to a further refinement, a table device is provided which contains the information that when an ignition event occurs is conveyed to the ignition control value output device.

According to a further refinement, only one single angle/time comparator is used for calculating the beginning charging angle and the ignition angle. This implies that there are only two interrupts, i.e., one for the charging and one for the ignition, irrespective of the number of cylinders in the internal combustion engine.

According to a further refinement, the calculation of the beginning charging angle and the ignition angle generally takes place in a synchronous raster, without a special ignition interrupt.

The latter two refinements create an extremely advantageous timing behavior with regard to the outside.

BRIEF DESCRIPTION OF THE DRAWINGS

FIG. 3 depicts a schematic representation of a pulse of an angle transmitter wheel.

DETAILED DESCRIPTION

Figure 5:
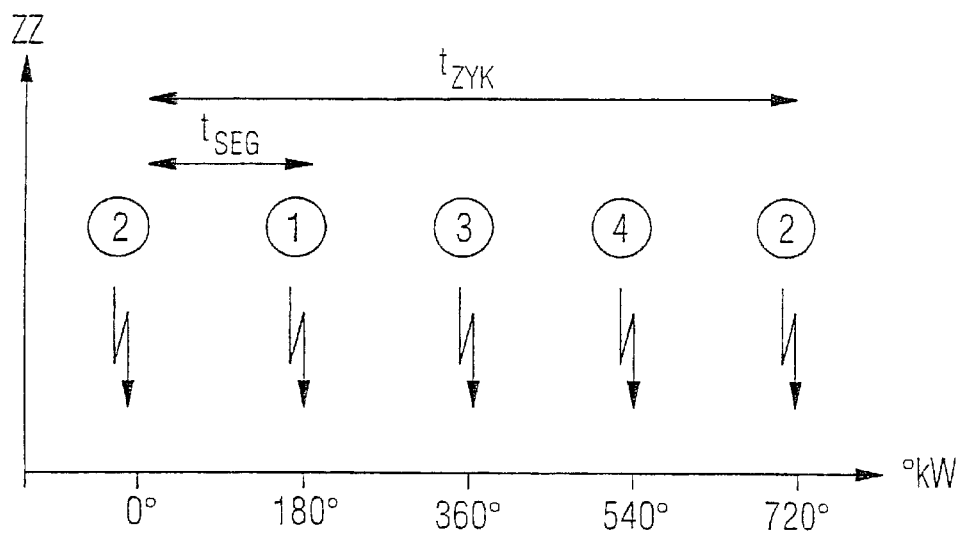
FIG. 5 depicts a schematic representation of the ignition sequence in a four-cylinder internal combustion engine.

For explaining the principle underlying the present invention, FIG. 5 depicts a schematic representation of the firing order in a four-cylinder internal combustion engine.

In FIG. 5, crank angle KW is entered on the x-axis in degrees and firing sequence ZZ is entered on the y-axis, the firing sequence having the order . . . 2-1-3-4-2- . . . . . A complete cycle amounts to 720° KW corresponding to a cycle time $t_{ZYK}$. One segment amounts to 720° KW/4=180°, corresponding to a segment time $t_{SEG}$.

Figure 6:
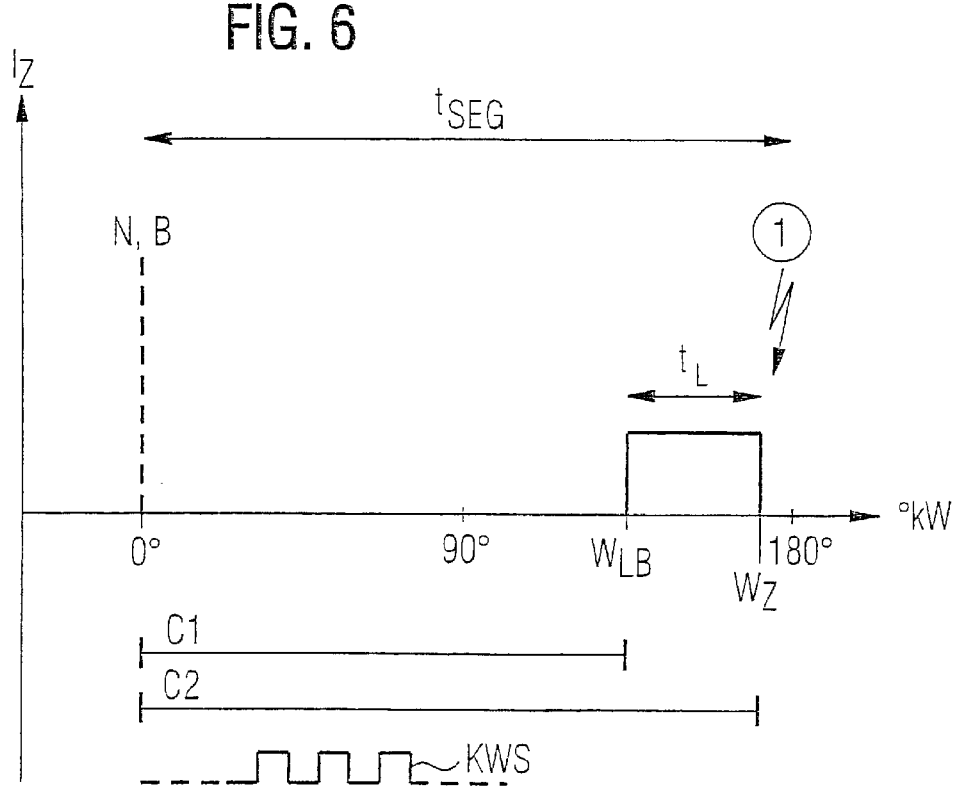
FIG. 6 depicts a schematic representation of the ignition control function sequences in the segment of the first cylinder of the four-cylinder internal combustion engine according to an embodiment of the present invention.

FIG. 6 depicts a schematic representation of the ignition control function sequences in the segment of the first cylinder of the four-cylinder internal combustion engine, with respect to the drive of ignition coil current $I_Z$.

At 0°, rotational speed N is measured, and immediately thereafter charging time $t_L$ as well as ignition angle $w_Z$ (approximately equal to the final dwell angle) are taken from a characteristics field B.

Thereupon, the beginning dwell and charging angle $W_{LB}$ are determined from the equation $$w_{LB} = w_Z - t_L \cdot \omega$$

assuming a uniform motion, ω being the angular velocity corresponding to rotational speed N. For reasons of computational running time, the temporal and angular position of the ignition events is only calculated once for every firing interval.

In the case of a charging-time output mode, using a counter C1 beginning from 0°, angle $w_{LB}$ is measured by crankshaft sensor signal KWS and when angle $w_{LB}$ is reached, the end stage of the ignition coil is driven. Then, charging time duration $t_L$ is controlled using a timer and, after charging time duration $t_L$ elapses, the driving is interrupted.

In the case of an ignition-angle output mode, using a counter C1 beginning from 0°, angle $w_{LB}$ is measured by crankshaft sensor signal KWS, and the end stage of the ignition coil is driven when angel $w_{LB}$ is reached. Using a further counter C2 beginning from 0°, angle $w_Z$ is measured by crankshaft sensor signal KWS and, when angle $w_Z$ is reached, the driving is interrupted.

Since the faulty calculation of the rotational speed curve, e.g., in the event of the engine starting, is not negligible, in the ignition control devices a prioritization is usually undertaken of the control goals, charging time and ignition angle. If the decision is made in favor of a precise output of the charging time—so-called charging time output mode— using the timer/counter circuit, then, in the start acceleration (rotational speed increase), a delay shift of the ignition angle results. On the other hand, if the ignition angle is output precisely—so-called ignition angle output mode—, then, in the starting dynamic, the charging time, and therefore the power in the ignition coil, is reduced, for which reason misfiring can result.

Therefore, it is advantageous to fixedly prescribe the output method, i.e., charging time output or ignition angle output, as a function of the characteristics of the target system, or a switchover in the output method occurs at a threshold rotational speed. In this context, a charging time output is advantageous during the start followed by a switchover to the ignition angle output beginning at a rotational speed threshold, at which the rotational speed scanning is at such a high frequency that the dynamic error is negligible, but at which the sensitivity of the torque sharply decreases over the ignition angle.

Figure 1:
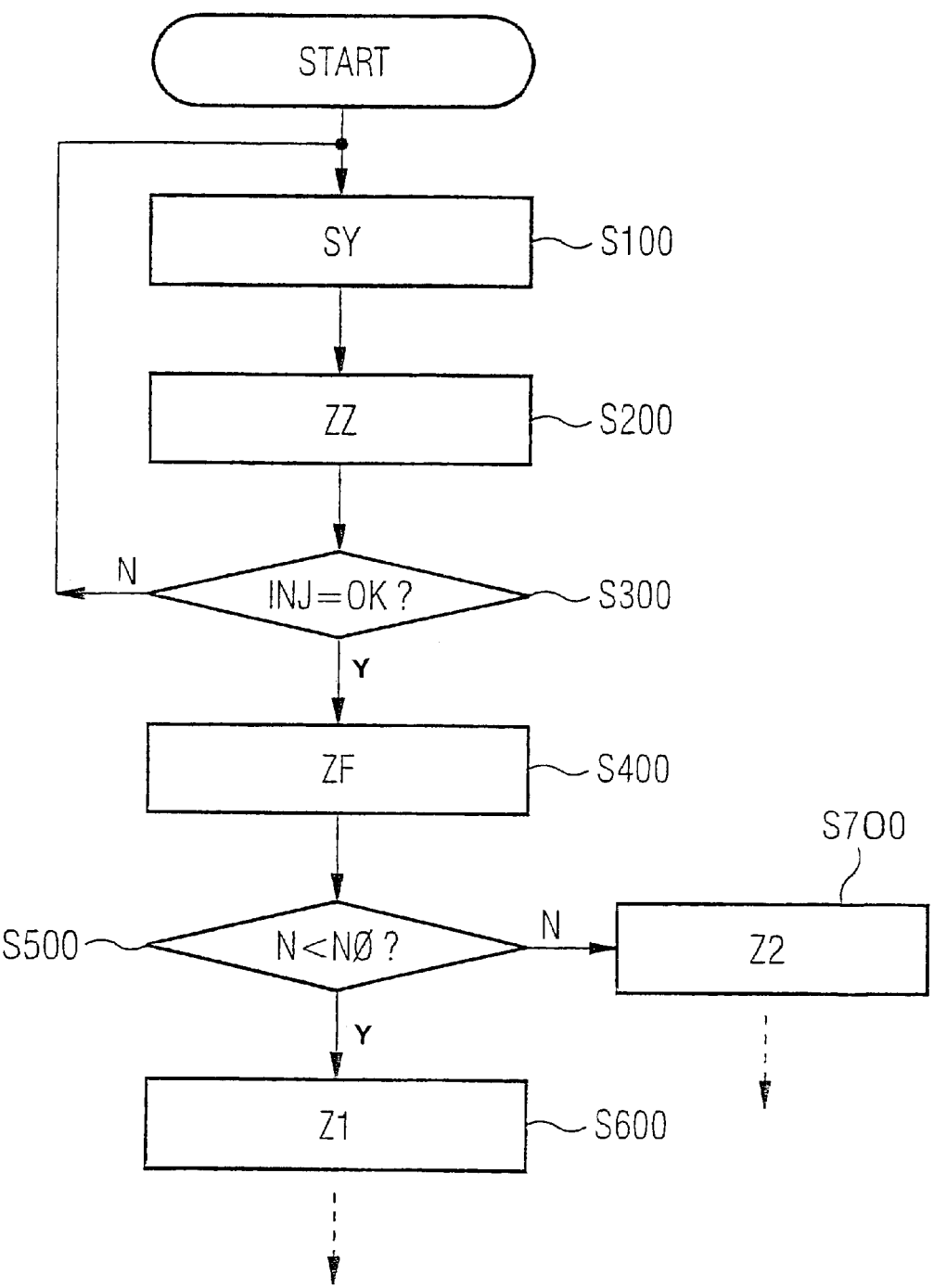
FIG. 1 depicts the basic sequence of synchronization and ignition output in the ignition control device according to an embodiment of the present invention.

FIG. 1 depicts the basic sequence of synchronization and ignition output in the ignition control device according to an embodiment of the present invention.

The specific embodiment depicted relates especially to an ignition control device for outputting ignition events for SI engines having a rotational angle measuring device, i.e., an angle measuring device. This rotational angle measuring device primarily delivers to the ignition output pulses at equidistant angles as well as at the beginning of a working cycle (720° KW in a four-cylinder engine) and at the beginning of a specific segment (180° KW in a four-cylinder engine).

The rotational angle measuring device activates the computing units of the output devices once for each firing interval with respect to a specific rotational angle, the so-called basic value. In the activation, the output devices are delivered information concerning the instantaneous angular velocity, as well as the number of the cylinder, determined by a synchronization, which is just moving directly to TDC (top dead center of the cylinder to be fired).

In the event that the equidistant angle pulses have a gap, for example for reasons of synchronization, the ignition output is supplied the position of the gap. The ignition output thereupon incorporates the gap information into that of the reorganized angular position of the output events.

The rotational angle measuring device for the basic value supplies a reference time and the number of the angle pulse. The rotational angle measuring device counts the angle pulses and at the same time has available to it a free running clock (clock pulse), whose time values for each angle pulse are stored in memory. Using a comparator unit, angle pulse numbers and clock times can be compared. If the comparative angle state or comparative clock time is equal to the state of the pulse counter value or the clock time, then the comparator unit triggers a calculation of the ignition output.

If the cylinder assignment and the beginning of the rotational interval are determined, then the ignition output is periodically activated in a constant angle interval by the rotational angle measuring device. The angle interval is derived from the rotational angle for a complete working cycle of the engine divided by the total number of cylinders. This angle interval is hereinafter termed the firing interval or segment. The ignition output, in this context, also receives the angular position of the software reference mark, hereinafter termed the basic value. The basic value should ideally be indicated in degrees in front of the OT of the working cylinder. In what follows, the basic value is therefore regarded as the angular position of the software reference mark with respect to OT.

As is depicted in FIG. 1, in step S100, a synchronization SY of the ignition control and the crank angle curve is carried out on the basis of the pulse pattern of the rotational angle measuring device. In step S200, a cylinder assignment ZZ of the cylinder moving to OT is made. The rotational angle measuring device supplies to the ignition output the information that a cylinder assignment has taken place. This means that the beginning of a 360° rotational angle interval and the number of the cylinder, which at the beginning of the interval was in the compression phase, were found. Only when this information has been conveyed does the synchronization part of the ignition output begin in further checks.

The ignition is only then enabled at step S400 (ZF) when an unambiguous cylinder detection has occurred and the cylinder of the current synchronization has been filled to a defined level, i.e., INJ=OK is confirmed at step S300. So that a defined start-up of the engine can take place and any delayed combustions can be prevented, the ignition output delays the beginning of further calculations until the device for the output of injection signals has signaled to the ignition output a defined injection. If an ignition were initiated given undefined mixture conditions, the engine would be able to start-up in the short-term using a possible residual wall film and, subsequently, when the wall film were removed, would break into the rotational speed before a defined run-up took place. In addition to the defined start-up, the probability of induction pipe backfires is reduced as a result of the enabling of the ignition in response to a successful injection. If the ignition has been enabled, then the ignition remains active for the remainder of the driving cycle as long as the rotational angle measuring device does not establish a loss in synchronization between the rotational angle signal and the signal processing methods.

As is depicted in steps S500, S600, and S700, ignition range Z1 is active at a threshold rotational speed N0, which can be fixedly set. Here, a precise maintenance of the dwell time is guaranteed by the ignition output, i.e., the charging time output mode. Above threshold rotational speed N0, ignition range Z2 is activated, and the precise ignition angle output is guaranteed, i.e., the ignition angle output mode.

Figure 2:
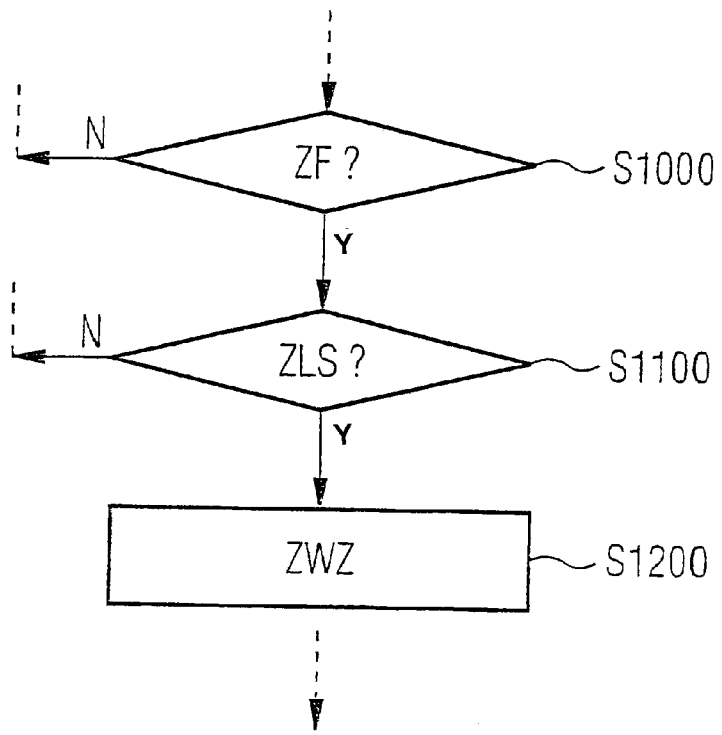
FIG. 2 depicts a segment of the basic sequence of synchronization and ignition output in the ignition control device according to an embodiment of the present invention, particularly illustrating a forced ignition.

FIG. 2 depicts a segment from the basic sequence of synchronization and ignition output in the ignition control device according to an embodiment of the present invention, particularly illustrating a forced ignition.

In accordance with the mechanisms described, the rotational angle measuring device activates the ignition output for every cylinder in the compression phase. In response to activating the ignition output, the cylinder position is before OT by the angle of the basic value. Within the firing interval, an ignition pulse must be output before the next call of the ignition output. If the preceding ignition has not yet been triggered during the next call for the ignition output, then the ignition pulse is late. In response to errors and to prevent damage to the ignition components, a forced ignition is then introduced.

In particular, at step S1000, the ignition enabling is checked. If it is then established at step S1100 that the ignition signal was not yet transmitted by preceding segment ZLS, then at step S1200 forced ignition ZWZ takes place.

For example, if, as a result of an error, for example, an EMV irradiation, faulty behavior of the ignition output occurs leading to late ignition angles, then the error is reduced as a result of a renewed call for the ignition output by the rotational angle measuring device because at the beginning of the ignition output, the determination depicted in FIG. 2 is carried out.

The ignition output, as noted, receives the number of the cylinder that is moving to ignition OT that is transmitted by the rotational angle measuring device. From the number of the cylinder, an address number within a table is determined, which contains the information that is transmitted to the output unit of the ignition output when the ignition event has occurred. The address number is generated from the cylinder number, the ignition circuit number, as well as the selected output mode. The cylinder number is transmitted to the ignition output by the rotational angle measuring device. The ignition circuit number is fixedly set in the sequence control of the ignition output, and the output mode results from the calculation of the ignition events or is transmitted to the ignition output from other devices of the engine control system. Below is a schematic representation of the form of a table of this type.

TABLE I

Ignition Masks in Four-Cylinder Engines

| Cylinder Number | Conventional Output of the Ignition | Emergency Operation | Power Charging | Other Modes |
| --- | --- | --- | --- | --- |
| 1 | address1: mask1 | address5: mask5 | address9: mask9 | address13: mask13 |
| 2 | address2: mask2 | address6: mask6 | address10: mask10 | address14: mask14 |
| 3 | address3: mask3 | address7: mask7 | address11: mask11 | address15: mask15 |
| 4 | address4: mask4 | address8: mask8 | address12: mask12 | address16: mask16 |

In the ignition output, temporal events and angle events must be synchronized with each other. FIG. 3 shows a rough sketch of the timing of one single spark on the basis of the signal of the rotational angle measuring device.

It can be seen that in one angle interval after the measurement of segment time TSEG, i.e., the time for one firing interval, power begins to be applied to the ignition system. This angle interval is hereinafter termed the beginning dwell angle. The power is defined in the ignition output discussed here over a time duration, the so-called dwell time. After the elapsing of the dwell time, the power introduced into the system is converted into an ignition spark.

Operative for the ignition output are two setpoint values $t_L$, $w_Z$, which must be coordinated with each other. The setpoint value dwell time, or charging time, i.e., the power metering duration, is transmitted to the ignition output (time criterion), and the ignition output receives the setpoint ignition angle (angle criterion). The ignition output must therefore calculate at which angle position, before the ignition angle, a beginning must be made to introduce power into the ignition system, so that the ignition power is sufficient.

For this purpose, in calculating the ignition events, an angle/time curve must be predicted. The ignition output discussed here, for the motion curve during one firing interval, assumes a uniform, i.e., not accelerated, motion. For beginning dwell angle Wb, the result then is:

$$Wb = Wout - (szout/tseg)*\text{segment angle}$$

given that:
Wout: setpoint ignition angle with respect to the angle position of the ignition event calculation
szout: the setpoint dwell time
tseg: presumptive duration of the current segment (this information is transmitted from the rotational angle measuring device to the ignition output).

Figure 4:
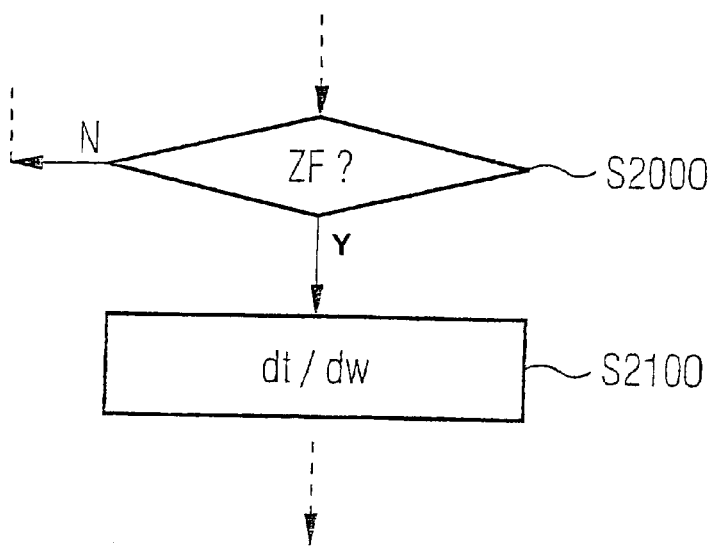
FIG. 4 depicts a segment of the basic sequence of synchronization and ignition output in the ignition control device according to an embodiment of the present invention, particularly illustrating a time/angle relation prediction.

As soon as the ignition output has been called and the synchronization and enabling criteria are valid, the ignition output calculates the time for one angle increment from the predicted segment time of the angle values described as integer values, which are processed as in the ignition output, as is illustrated in FIG. 4.

As was already demonstrated, the ignition output has the task of controlling a power metering time, and the end of the metering time is reached at the angle location defined over the ignition angle. Thus, the ignition output measures both the angle as well as the time intervals for the ignition events of the cylinders of the SI engine.

In all output modes of the ignition output, first the beginning dwell angle described above is measured and, at this point, the signal for the power metering is output from the power-setting device of the ignition output.

As described, the computing logic is activated at the beginning of a firing interval by a general enabling signal of the rotational angle measuring device. The enabling signal at the same time activates all of the other computing units of the engine control system which must interact with the ignition output. At the beginning of the calculations, the ignition output receives from the rotational angle measuring device the most recent rotational speed information, which was determined over a defined measuring angle interval.

The rotational speed information is immediately used by the ignition output to determine, in accordance with the above equation, the beginning dwell angle from the setpoint values for dwell time and ignition angle, which are transmitted by other computing units. The beginning dwell angle is produced as the angle interval of the beginning of the power metering regarding the position of the event calculation. This angle is converted into a number of angle transmitter pulses corresponding to the beginning dwell angle. The residual angle, which cannot be measured by the angle pulses, is written into a buffer of the output unit of the ignition output. The pulse number is transmitted to a switching unit of the ignition output, which automatically compares the pulse number with a tooth pulse counter of the angle measuring device. If the tooth pulse counter is equal to the pulse number, then the computing unit of the ignition output is once again activated, but this time by the internal switching unit and not by the rotational angle measuring device. In the renewed calculation, the residual angle stored in an internal buffer is related to the time for the previous tooth periods of the angle transmitter. This value is queried in the rotational angle measuring device. From the residual angle and the previous tooth period, a period of time results until the actual angle location of the beginning of the dwell period; for this purpose, a specific angle/time motion form of the engine is assumed. The time duration is in turn transmitted to the internal comparator circuit. The circuit this time is connected via a switch to the free running timer of the angle measuring device.

The same mechanism as in the case of the tooth comparison occurs this time at the level of time. If the timer reaches the time comparison value, then the internal circuit in turn triggers a calculation of the ignition output. The latter then accesses the mask table described above and transmits the table value appropriate to the operating parameters to the power-setting unit of the ignition output. The power input into the system then takes place.

The assumption of constant angular velocity results in the circumstance that, if the dwell time is output precisely under the influence of acceleration in accordance with the beginning dwell angle, the actual ignition angle is shifted so as to be late in comparison to the setpoint value of the ignition angle.

If the dwell time is interrupted precisely at the location of the ignition angle, the setpoint dwell time could not be maintained. In principle, there are two output methods for the ignition output, which are both supported by the ignition output under discussion, the precise output of the dwell time or the precise output of the ignition angle.

The precise output of the dwell time, in what follows, is termed ignition range 1, and the precise output of the ignition angle, in what follows, is termed ignition range 2.

The greatest dynamic fault is achieved in starting the engine. Here, the rotational speed actualization is at its lowest and the acceleration at its highest. Since in this phase the angular position of the combustion point of concentration, which ultimately is supposed to be controlled by the ignition angle, is subjected in any case to a tolerance of greater than 20%, and, on the other hand, the power requirements of the ignition system are the greatest, above all, in cold starting, the ignition output operates at lower rotational speeds in ignition range Z1. As a result, maintaining the setpoint power is assured, assuming that all devices participating in the power switchover are operating normally. The switchover to ignition range Z2 is parametrized using a constant. As a result, it is possible to have the ignition output operating exclusively in one of the two modes.

In ignition range Z2, the ignition angle as well as the beginning dwell angle are driven by the counting-out of angle pulses. The dwell period is maintained as effectively as the angle/time curve of the engine in the power calculation was predicted by the rotational angle measuring device, when the ignition output was called.

In ignition range Z1, after the beginning dwell angle is reached, the table value of the power-setting device is transmitted. At the location of the dwell beginning, the switching unit is switched over to the timer comparison in order to compare the tooth counter and the timer of the angle measuring device, and it is charged using the dwell time as a timer comparison value. In this manner, the dwell period is precisely maintained by the high-resolution timer of the angle measuring device. Here too, a dynamic fault can result, this time in the position of the ignition angle, from the quality of the prediction of the angle/time curve of the rotational motion.

The ignition events, the power charging and the ignition, are only driven by two interrupts, i.e., for the ignition only two lines/channels are required from a comparator unit of the rotational angle measuring device.

The comparator unit, in the event of agreement with an angle pulse value, triggers the calculation of the increment refinements and is automatically switched over to timer comparison, under which the residual angle is counted out. The comparator unit counts out either the beginning dwell angle and the ignition angle in parallel, or, after the beginning dwell angle, the ignition signal is triggered by a timer comparison, i.e., the comparator unit is at first not switched at all into the angle number mode. Therefore, from the comparator unit there is only one channel to be provided for the ignition and one channel for the beginning of the charging.

In the related art, a plurality of channels are customary here for different cylinders.

Although the present invention was described above on the basis of preferred exemplary embodiments, it is not limited thereto, but rather it can be modified in many ways.

In particular, the present invention is not limited to a four-cylinder internal combustion engine, but can be generalized as desired.

In addition, apart from the injection criterion, other injection enabling criteria can be built in.

What is claimed is:

1. A method for operating an internal combustion engine, the internal combustion engine including an ignition output unit, a crankshaft and an angle transmitter wheel, the method comprising the steps of:

generating angle pulses at the angle transmitter wheel synchronously with a motion of the crankshaft;

calculating at least one beginning dwell angle in each segment of an engine cycle of the internal combustion engine by the ignition output unit, the at least one beginning dwell angle being determined as a sum of a specific number of angle pulses and a residual angle;

counting the angle pulses;

determining whether the specific number of angle pulses has been reached using a comparator unit;

determining a time for reaching the residual angle including taking into account an instantaneous rotational speed; and after the time for reaching the residual angle has elapsed, triggering a beginning of a charging time of an ignition coil.

2. The method of claim 1, further comprising:

calculating by the ignition output unit at least one further quantity for determining an ignition angle.

3. The method of claim 1, further comprising:

calculating, in a second mode, an ignition angle as a further quantity, the ignition angle being calculated by the ignition output unit as a sum of a number of angle pulses and a residual angle;

after a time for reaching the residual angle has elapsed, triggering a termination of a charging time of the ignition coil.

4. The method of claim 3, further comprising:

calculating, in a first mode, a dwell time as a further quantity for determining the ignition angle; and triggering a termination of a charging time of the ignition coil after the dwell time elapses using the comparator unit.

5. The method of claim 4, further comprising:

switching the ignition output unit alternatingly between the first mode and the second mode as a function of an operating parameter.

6. The method of claim 5, wherein the operating parameter is one of rotational speed and a time after a starting of the internal combustion engine.

7. The method of claim 1, further comprising:
expressing, using the ignition output unit, at least one of the residual angle and the dwell time as a number of clock pulses of an independent clock-pulse. generator, the independent clock-pulse generator functioning independently of crankshaft motion, each of the clock pulses being relayed to the comparator unit.

8. The method of claim 4, wherein the ignition output unit is coupled to the comparator unit via a first line and a second line, a first signal generated by the comparator unit at the beginning of the charging time of the ignition coil being supplied to the ignition output unit via the first line, and a second signal generated by the comparator unit at the termination of the charging time of the ignition coil being supplied to the ignition output unit via the second line.

9. The method of claim 1, wherein the calculating step includes calculating the at least one beginning dwell angle after an injection.

10. An apparatus for operating an internal combustion engine including a crankshaft, comprising:
an angle transmitter wheel that generates angle pulses synchronously with the crankshaft;
a comparator unit that determines whether a specific number of angle pulses has been reached; and
an ignition output unit configured to calculate at least one beginning dwell angle in each segment of an engine cycle of the internal combustion engine, the ignition output unit including a first arrangement configured to determine the at least one beginning dwell angle as a sum of a number of angle pulses and a residual angle, and an activatable calculating unit, the calculating unit determining a time required for the residual angle taking into account an instantaneous rotational speed;
wherein the comparator unit determines whether the time required for the residual angle has elapsed so that a beginning of a charging time of an ignition coil is triggered.

11. The apparatus of claim 10, wherein the ignition output unit is configured to calculate at least one further quantity determining an ignition angle.

12. The apparatus of claim 10, wherein the ignition unit has a first mode and in a second mode, in the second mode, the ignition unit is configured to calculate a setpoint ignition angle as a further quantity determining an ignition angle, the first arrangement of the ignition output unit configured to determine the setpoint ignition angle as a sum of a number of angle pulses and a residual angle, and after the comparator unit subsequently determines that the time required for the residual angle has elapsed, a termination of the charging time of the ignition coil is triggered by the comparator unit.

13. The apparatus of claim 12, wherein when the ignition unit is in the first mode, the ignition is configured to calculate a dwell time as a further quantity determining the ignition angle, and after the dwell time has elapsed, the comparator unit configured to trigger a termination of the charging time of the ignition coil.

14. The apparatus of claim 13, wherein the ignition coil is configured to switch alternatingly between the first and second modes as a function of an operating parameter.

15. The apparatus of claim 14, wherein the operating parameter is one of a rotational speed or a time after a starting of the internal combustion engine.

16. The apparatus of claim 10, further comprising:
an independent clock-pulse generator operating independently of crankshaft motion;
wherein the ignition output unit includes a second arrangement configured to express the residual angle or a dwell time as a number of clock pulses of the independent clock-pulse generator, the clock pulses of the clock-pulse generator being conveyed to the comparator unit.

17. The apparatus of claim 13, further comprising:
a first line coupling the comparator unit and the ignition output unit; and
a second line coupling the comparator unit and the ignition output unit;
wherein the comparator unit is configured to generate a first signal at the beginning of the charging time of the ignition coil, the first signal being provided to the ignition output unit via the first line, and wherein the comparator unit is configured to generate a second signal at the termination of the charging time of the ignition coil, the second signal being provided to the ignition output unit via the second line.

18. The apparatus of claim 10, wherein the first arrangement of the ignition output unit calculates the beginning dwell angle after an injection occurs.

* * * * *